United States Patent
Seo et al.

(10) Patent No.: US 8,996,852 B2
(45) Date of Patent: Mar. 31, 2015

(54) ELECTRONIC DEVICE AND BOOTING METHOD THEREOF

(75) Inventors: Hye-yeong Seo, Suwon-si (KR); Hak-bong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 13/448,854

(22) Filed: Apr. 17, 2012

(65) Prior Publication Data

US 2012/0272050 A1  Oct. 25, 2012

(30) Foreign Application Priority Data

Apr. 19, 2011 (KR) .......... 10-2011-0036300

(51) Int. Cl.
- *G06F 9/24* (2006.01)
- *G06F 15/177* (2006.01)
- *G06F 11/14* (2006.01)
- *G06F 9/44* (2006.01)

(52) U.S. Cl.
CPC .......... *G06F 11/1417* (2013.01); *G06F 9/4403* (2013.01)
USPC ................................... 713/2; 713/1; 713/324

(58) Field of Classification Search
CPC ... G06F 9/4401; G06F 9/4403; G06F 9/4418; G06F 9/442; G06F 11/1417; G06F 11/1441; G06F 11/142; G06F 11/14; G06F 11/1402
See application file for complete search history.

(56) References Cited

U.S. PATENT DOCUMENTS

| | | | |
|---|---|---|---|
| 7,058,831 B2 * | 6/2006 | Cheok et al. ................. | 713/320 |
| 2002/0073358 A1 * | 6/2002 | Atkinson ....................... | 714/21 |
| 2002/0087816 A1 * | 7/2002 | Atkinson et al. ............. | 711/156 |
| 2002/0138669 A1 | 9/2002 | Kadatch et al. | |
| 2005/0015580 A1 | 1/2005 | Chen et al. | |
| 2005/0044453 A1 | 2/2005 | Dunstan et al. | |
| 2010/0131789 A1 * | 5/2010 | Kimura ........................ | 713/323 |

FOREIGN PATENT DOCUMENTS

EP      2284706 A1    2/2011

OTHER PUBLICATIONS

Communication dated Oct. 29, 2012 issued by the European Patent Office in counterpart European Patent Application No. 12160492.0.

\* cited by examiner

*Primary Examiner* — Dennis M Butler
(74) *Attorney, Agent, or Firm* — Sughrue Mion, PLLC

(57) ABSTRACT

An electronic device and a method of booting the electronic device is provided. The electronic device and method include a power supply unit, a volatile memory, a non-volatile memory, and a controller which, in response to power being supplied by the power supply unit, performs booting in a first booting mode that uses a suspend image stored in the volatile memory; and, in response to an error occurring in the first booting mode, performs a next booting in a second booting mode that uses a suspend image stored in the non-volatile memory. In response to power being supplied by the power supply unit, performing booting in a first booting mode that uses a suspend image stored in the volatile memory; and in response to an error occurring in the first booting mode, performing a next booting in a second booting mode using a suspend image stored in the non-volatile memory.

16 Claims, 4 Drawing Sheets

FIG. 4

```
linux kernel config : The following options are on
        - enable CONFIG_PM
        - enable CONFIG_SOFTWARE_SUSPEND
        - enable CONFIG_SWSUSP_MTDBLOCK_FLUSH
        - enable CONFIG_SUSPEND2
        - enable CONFIG_SUSPEND2_CRYPTO
        - enable ACPI (Advanced Configuration and Power Interface)

rootfs script : The following commands are used in a script on condition.
        - resume from disk :
          * Method 1 :
                $resume=/dev/mtdblock3
          * Method 2 :
                $resume2=swap:/dev/mtdblock3

- suspend to disk : Two methods below
          * Method 1 :
                (enable flash as swap)
                $ mkswap /dev/mtdblock3
                $ swapon /dev/mtdblock3

(run some applications)

(trigger suspend to disk)
                $ echo disk > /sys/power/state

* Method 2 :
                $ mkswap /dev/mtdblock3
                $ swapon /dev/mtdblock3

(trigger suspend2 to disk)
                $ hibernate

- resume from ram :
        $ cat $TMP_FILE > /proc/bus/pci/$ID

- suspend to ram :
        $ echo "mem" > /sys/power/state
```

ELECTRONIC DEVICE AND BOOTING METHOD THEREOF

CROSS-REFERENCE TO RELATED APPLICATION

This application claims priority from Korean Patent Application No. 10-2011-0036300, filed on Apr. 19, 2011, in the Korean Intellectual Property Office, the disclosure of which is incorporated herein by reference in its entirety.

BACKGROUND

1. Field

Methods and apparatuses consistent with exemplary embodiments relate to an electronic device and a method of booting the electronic device. More particularly, the method and apparatus relate to an electronic device which performs booting using a volatile memory and a non-volatile memory, and a method of booting the electronic device.

2. Description of the Related Art

A general computer system goes through a power-on self test to check whether or not each of the devices connected thereto, such as a central processing unit (CPU), a memory, a graphic card, a hard disk, and a floppy disk performs a normal operation, when power is supplied. If there is no abnormal operation, an operating system (OS) is driven.

Next, the OS searches for information set for hardware and software of the system and allows the system to operate. This is called "booting."

When a personal computer (PC) is turned off, even in a standby mode such as a suspend mode or a resume mode, the PC consumes little power in order to perform a function of automatically storing job contents which has been executed until power to the PC is turned off in a hard disk drive (HDD). Therefore, in response to the PC being suspended for a long time, data may be lost. Since hibernation does not consume power in order to maintain memory capability, data may not be lost and power saving exists. However, a data preserving area should be guaranteed on a hard disk in advance. Therefore, hibernation is a concept different from backup that is based on the premise that programs or data are copied and preserved. In other words, backup is a precaution (data copy or reservation) against system damage or disorder, but the hibernation is a simultaneous action to prevent loss of job contents which is currently being executed.

Job contents that have been executed until power of a PC is turned off are called a "suspend image," and, as a kind of hibernation, various booting schemes exist, according to how such a suspend image is stored or used when the power to the PC is turned off. Accordingly, there is a demand for a method for reducing booting time by appropriately combining various booting schemes.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide an electronic device, which performs booting while changing a booting scheme in a step-wise manner, and a method of booting the electronic device.

According to an aspect of an exemplary embodiment, there is provide an electronic device including a power supply unit, a volatile memory, a non-volatile memory, and a controller which in response to power being supplied by the power supply unit, performs booting in a first booting mode that uses a suspend image stored in the volatile memory, and, in response to an error occurring in the first booting mode, controls the next booting in a second booting mode that uses a suspend image stored in the non-volatile memory.

If an error occurs in the second booting mode, the controller may perform the next booting in a third booting mode, such that the power supply is completely shut off and then power is supplied again.

If the power supplied by the power supply unit is shut off, the controller may perform a first power saving operation in order to store data which is being currently processed in the volatile memory. In response to an error occurring during the first power saving operation, the controller may perform a second power saving operation in order to store the data in the non-volatile memory in a next power shutting off time. If an error occurs during the second power saving operation, the controller may perform a normal power-off operation.

The error may be at least one of memory leakage, memory fragmentation and deadlock.

The volatile memory may be a random access memory (RAM), and the non-volatile memory may be a hard disk (HDD) or a flash memory.

If an error does not occur in each booting mode, the controller may set a corresponding booting mode as a booting mode, and, in response to an error occurring in each booting mode, may change the set booting mode.

If the pre-set booting mode is the first booting mode, the controller may perform the booting in the first booting mode and determines whether the booting is performed in the third booting mode, and upon determining that the booting is not performed in the third booting mode, may perform the booting in the second booting mode.

The first booting mode, the second booting mode, and the third booting mode may correspond to the first power saving operation, the second power saving operation, and the normal power-off operation, respectively.

According to an aspect of another exemplary embodiment, there is provided a method of booting an electronic device which comprises a power supply unit, a volatile memory, and a non-volatile memory. The method of booting the electronic device includes, in response to power being supplied by the power supply unit, performing booting in a first booting mode that uses a suspend image stored in the volatile memory, and in response to an error occurring in the first booting mode, performing a next booting in a second booting mode that uses a suspend image stored in the non-volatile memory.

According to the method of booting the electronic device, in response to an error occururring in the second booting mode, performing a next booting in a third booting mode, such that power supply is completely shut off and then power is supplied again.

According to the method of booting the electronic device, in response to power supplied by the power supply unit being shut off, performing a first power saving operation in order to store data which is being currently processed in the volatile memory. In response to an error occurring during the first power saving operation, performing a second power saving operation in order to store the data in the non-volatile memory in a next power shutting off time. and in response to an error occurring during the second power saving operation, performing a normal power-off operation.

The error may be at least one of memory leakage, memory fragmentation and deadlock.

The volatile memory may be a RAM and the non-volatile memory may be a hard disk or a flash memory.

The method of booting the electronic device may further include, in response to an error not occurring in each booting mode, setting a corresponding booting mode as a booting mode.

The method of booting an electronic device may further include, in response to a pre-set booting mode being the first booting mode, performing booting in the first booting mode. In response to the pre-set booting mode not being the first booting mode, determining whether the booting is performed in the third booting mode, and in response to a determination that the booting is performed in the third booting mode, performing the booting in the second booting mode.

The first booting mode, the second booting mode, and the third booting mode may correspond to the first power saving operation, the second power saving operation, and the normal power off operation, respectively.

Accordingly, the time required to boot the electronic device can be reduced.

Additional aspects and advantages of the exemplary embodiments will be set forth in the detailed description; will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 4 is a view of an example of illustration to check whether or not a method of booting an electronic device according to an exemplary embodiment is applied.

DETAILED DESCRIPTION OF THE EXEMPLARY EMBODIMENTS

Figure 1:
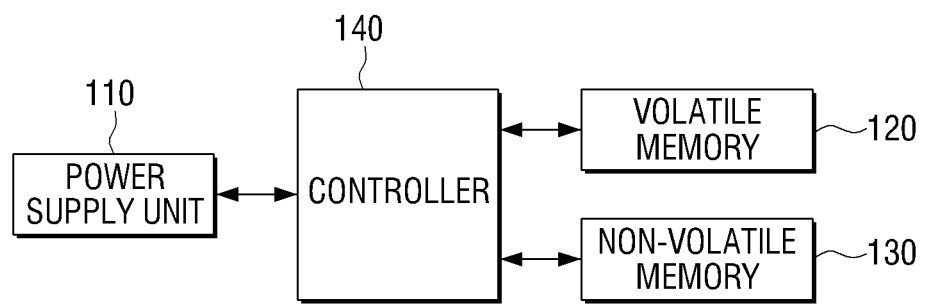
FIG. 1 is a block diagram illustrating an electronic device according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist with a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating an electronic device according to an exemplary embodiment.

Referring to FIG. 1, an electronic device 100 according to an exemplary embodiment includes a power supply unit 110, a volatile memory 120, a non-volatile memory 130, and a controller 140.

Electronic device 100 may be realized by various electric devices such as a desk top personal computer (PC), a hand-held PC, a palm PC, and a personal digital assistant (PDA).

In particular, electronic device 100 may be configured to adopt a power saving mode, which is one of the techniques of managing a power supply.

More specifically, electronic device 100 enters the power saving mode (for example, a slip mode), which is one of the techniques for managing a power supply, while storing data which has been processed in a volatile memory or a non-volatile memory. To achieve this, a suspend to random access memory (RAM) mode and a suspend to disk mode may be provided.

In the suspend to RAM mode, a RAM stores data. Thus, it is possible to enter the power saving mode quickly. However, minimum power is required in order to protect the data stored in the RAM.

Specifically, according to the suspend to RAM mode, when the power saving mode is entered or power is turned off, data which is currently being processed is stored in a volatile memory such as a RAM. When the power is turned on and electronic device 100 is booted, the data is read out from the RAM. Therefore, it is possible to preserve the data even when the power is turned off.

On the other hand, in the suspend to disk mode, the data which is currently being processed is stored in a non-volatile memory such as a hard disk or a flash memory, and power supply is shut off. Accordingly, a satisfactory power saving effect occurs because although the power supply is completely shut off, the data is slowly stored in the hard disk, compared to the suspend to RAM mode.

Power supply unit 110 supplies power to each of the function blocks of electronic device 100.

Volatile memory 120 may be realized by a RAM and may store the data which is being currently processed according to the above-described suspend to RAM mode.

Non-volatile memory 130 may be realized by a hard disk or a flash memory, and may store the data which is being currently processed according to the above-described suspend to disk mode; i.e., a suspend image.

Controller 140 determines whether a pre-set booting mode is a first booting mode or not, when power is supplied by the power supply unit 110, and performs booting in the first booting mode in response to the pre-set booting mode being determined to be the first booting mode.

The first booting mode refers to a booting mode that uses a suspend image stored in volatile memory 120 and may correspond to the suspend to RAM mode.

If an error occurs in the first booting mode, controller 140 sets the booting mode such that next booting is performed in a second booting mode that uses a suspend image stored in the non-volatile memory 130.

Also, if the pre-set booting mode is not determined to be the first booting mode, controller 140 determines whether or not the booting is performed in a third booting mode. The third booting mode refers to a booting mode in which power supply is complete shut off and then power is supplied again, and may be a cold boot. The cold boot is the opposite of a warm boot in which a computer is driven in a state where electricity always flows in main parts of the computer for the sake of safety of the computer or swift booting. The cold boot refers to a function of turning on a computer first or turning off the computer and then on again using a power button.

If the pre-set booting mode is not determined to be the third booting mode, controller 140 performs the booting in the second booting mode. The second booting mode refers to a booting mode that uses the suspend image stored in the non-volatile memory 130 and may correspond to the above-described suspend to disk mode.

Also, if an error occurs in the second booting mode, controller 140 may perform a next booting in the third booting mode such that power supply is shut off and then power is supplied again.

If the power supplied by power supply unit 110 is shut off, controller 140 determines whether or not the pre-set booting mode is the first booting mode, and if in response to the pre-set booting mode being the first booting mode, performs a first power saving operation to store the data which is being currently processed in volatile memory 120.

Also, in response to an error occurring during the first power saving operation, controller 140 sets the booting mode to perform a second power saving operation such that the data is stored in the non-volatile memory the next time the power is shut off.

Also, in response to the pre-set booting mode not being the first booting mode, controller 140 determines whether or not the pre-set booting mode is the second booting mode, and in response to the pre-set booting mode being the second booting mode, the controlller performs the second power saving operation in order to store the data which is being currently processed in non-volatile memory 120.

If an error occurs during the second power saving operation, controller 140 may set the booting mode such that a normal power off operation is performed.

The error in the above exemplary embodiment may be due to at least one of memory leak, memory fragmentation, and deadlock.

The memory leak refers to a phenomenon in which a pre-determined program continues occupying an unnecessary memory. For example, if an assigned memory is not returned after having been used and this event is accumulative, the memory is wasted.

Memory fragmentation refers to a phenomenon in which an empty space of a memory or a material is divided into several fragments. This phenomenon may reduce the available space of a memory device or delay a data-reading and/or writing speed.

Memory deadlock refers to a phenomenon in which a memory is in a deadlock, that is, a memory is stopped.

Figure 2:
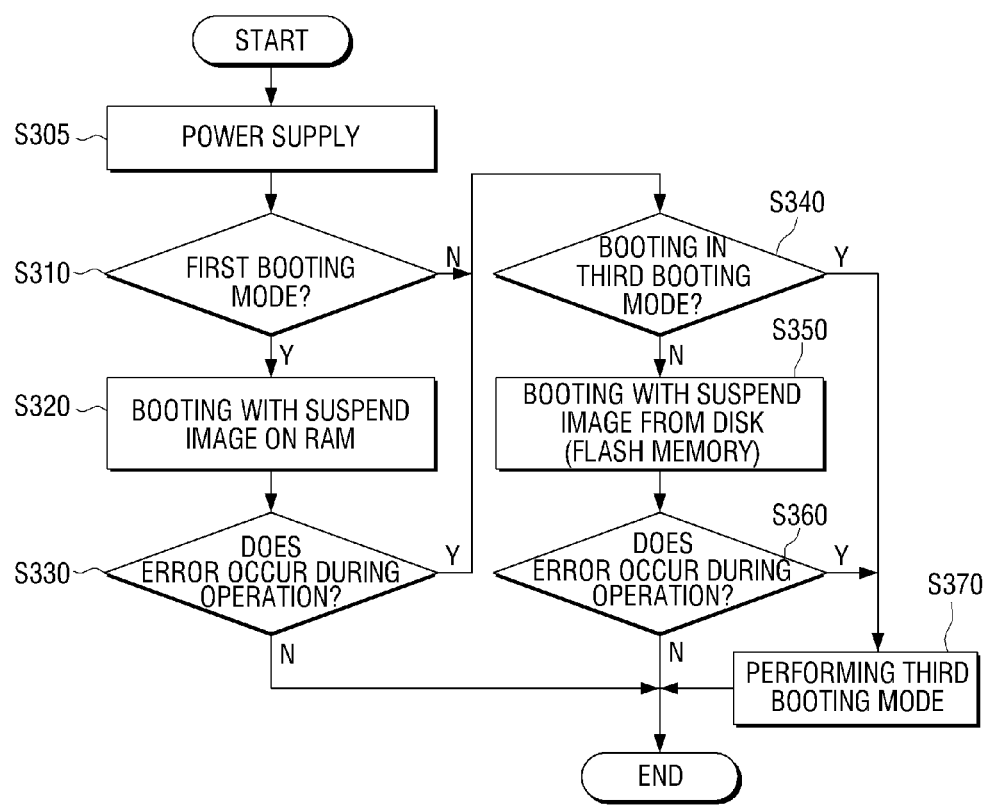
FIG. 2 is a flowchart illustrating a method of booting an electronic device according to an exemplary embodiment.

FIG. 2 is a flowchart illustrating a method of booting an electronic device, according to an exemplary embodiment.

According to the booting method of the electronic device of FIG. 2, in response to the electronic device being supplied with power (S305), a determination is made as to whether or not a pre-set booting mode is a first booting mode (S310). The first booting mode recited herein may be a suspend to RAM mode and may have a boot mode value of 3, for example.

If the pre-set booting mode is the first booting mode (S310: Y), booting is performed with a suspend image on a RAM according to the suspend to RAM mode.

In response to an error occurring in the first booting mode (S330: Y), a determination made as to whether or not the booting is performed in a third booting mode (S340). The third booting mode may be the above-described cold booting mode and may have a boot mode value of 1, for example.

If it is determined that the booting is to be performed in the third booting mode (S340: Y), cold booting is performed (S370).

In response to a determination that the booting is not performed in the third booting mode (S340:N), the booting is performed in a second booting mode (S350). For example, the second booting mode may be a suspend to disk mode and may have a boot mode value of 2.

In response to an error occurring in the second booting mode (S360: Y), the third booting mode, that is, cold booting is performed (S370).

Figure 3:
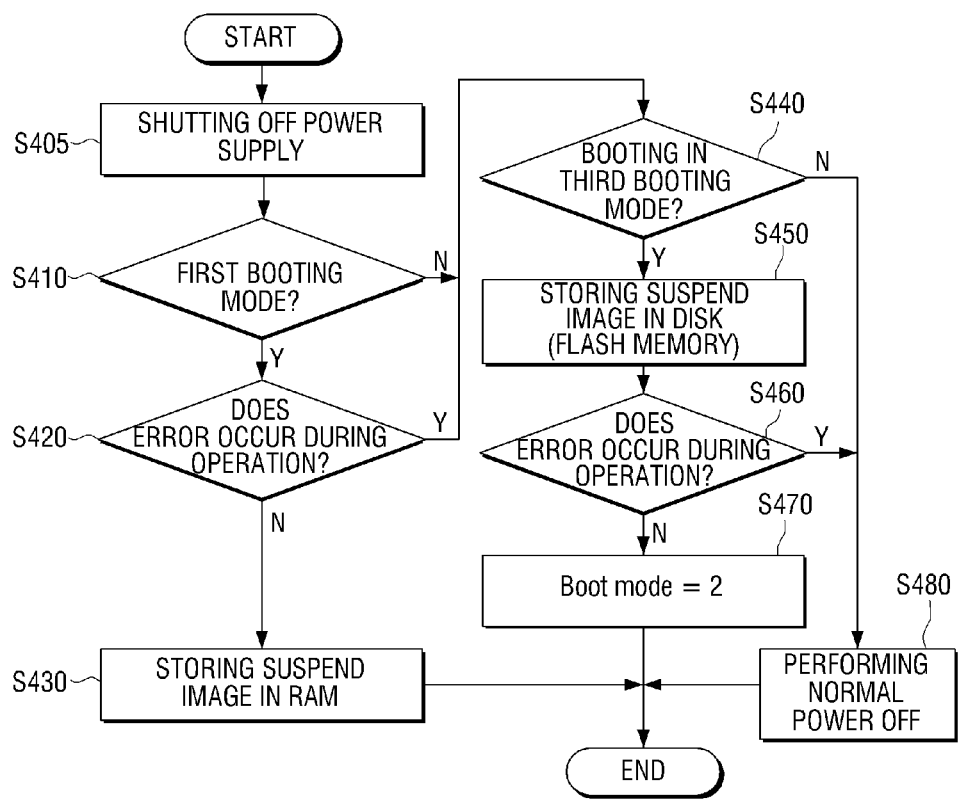
FIG. 3 is a flowchart illustrating a method of booting an electronic device according to an exemplary embodiment.

FIG. 3 is a flowchart illustrating a method of booting an electronic device, according to an exemplary embodiment.

According to the method of booting the electronic device of FIG. 3, in response to power being shut off in the electronic device (S405), a determination is made as to whether or not a pre-set booting mode is a first booting mode (S410). For example, the first booting mode may be a suspend to RAM mode and may have a boot mode value of 3.

If the pre-set booting mode is the first booting mode (S410: Y), an operation is performed according to the suspend to RAM mode.

In response to an error not occurring in the first booting mode (S420: N), a suspend image is stored in a RAM according to the suspend to RAM mode (S430)

Also, in response to an error occurring in the first booting mode (S420: Y), a determination is made as to whether or not the booting is performed in a third booting mode (S440). For example, the third booting mode may be the above-described cold booting mode and may have a boot mode value of 1.

In response to a determination that the booting is performed in the third booting mode (S440: Y), a normal power-off operation is performed (S480).

Also, in response to a determination that the booting is not performed in the third booting mode (S440: N), the booting is performed in a second booting mode. For example, the second booting mode may be a suspend to disk mode and may have a boot mode value of 2. Accordingly, a suspend image is stored in a disk or a flash memory (S450).

In response to an error occurring in the second booting mode (S460:Y), the normal power-off operation is performed (S480).

In response to an error not occurring in the second booting mode (S460: N), the booting mode is set to the second booting mode (S470). In other words, the boot mode value is set to 2 (boot mode=2).

FIG. 4 is a view an example of illustration for determining whether or not the method of booting an electronic device according to an exemplary embodiment will be applied.

The present disclosure may include a storage medium that stores a program for executing the method of booting the electronic device described above; i.e. a computer readable recording medium. The computer readable recording medium includes all types of recording devices that store data readable by a computer system. Examples of the computer readable recording medium include a ROM, a RAM, a CD-ROM, a magnetic tape, a floppy disk, and an optical data storage device. Also, the computer readable recording medium is distributed in a computer system connected to a network and stores and executes a code readable by a computer in a distributed manner.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. An electronic device, comprising:
a power supply unit;
a volatile memory;
a non-volatile memory; and a controller which, in response to an initial power-on of the electronic device in which power is supplied by the power supply unit, performs booting in a first booting mode that uses a suspend image stored in the volatile memory, and in response to an error occurring in the first booting mode, performs a next booting in a second booting mode that uses a suspend image stored in the non-volatile memory.

2. The electronic device as claimed in claim 1, wherein, in response to an error occurring in the second booting mode, the controller performs a next booting in a third booting mode where the power supply is completely shut off and then supplying power again.

3. The electronic device as claimed in claim 2, wherein the first booting mode, the second booting mode, and the third booting mode correspond to a first power saving operation, a second power saving operation, and a normal power-off operation, respectively.

4. The electronic device as claimed in claim 1, wherein, in response to the power supplied by the power supply unit being shut off, the controller performs a first power saving operation in order to store data which is currently being processed in the volatile memory, in response to an error occurring during the first power saving operation, the controller performs a second power saving operation in order to store the data in the non-volatile memory, and in response to an error occurring during the second power saving operation, the controller performs a normal power-off operation.

5. The electronic device as claimed in claim 1, further comprising:

the error results from at least one of memory leakage, memory fragmentation, and deadlock.

6. The electronic device as claimed in claim 1, further comprising:

the volatile memory is a random access memory (RAM), and the non-volatile memory is a hard disk (HD) or a flash memory.

7. The electronic device as claimed in claim 1, wherein, in response to an error not occurring in the first booting mode or the second booting mode, the controller sets a corresponding the first booting mode or the second booting mode as a booting mode, and, in response to an error occurring in the first booting mode or the second, the controller changes a set booting mode.

8. The electronic device as claimed in claim 7, wherein, in response to a pre-set booting mode being the first booting mode, the controller performs the booting in the first booting mode and if pre-set booting mode is not the first booting mode determines whether or not the booting is performed in a third booting mode, and when it is determined that the booting is not performed in the third booting mode, the controller performs the booting in the second booting mode.

9. A method of booting an electronic device which comprises a power supply unit, a volatile memory, and a non-volatile memory, the booting method comprising:

in response to an initial power-on of the electronic device in which power is supplied by the power supply unit, performing booting in a first booting mode that uses a suspend image stored in the volatile memory; and in response to an error occurring in the first booting mode, performing a next booting in a second booting mode that uses a suspend image stored in the non-volatile memory.

10. The booting method as claimed in claim 9, further comprising, in response to an error occurring in the second booting mode, performing a next booting in a third booting mode such that the power supply is completely shut off and then supplying power again.

11. The booting method as claimed in claim 10, wherein the first booting mode, the second booting mode, and the third booting mode correspond to a first power saving operation, a second power saving operation, and a normal power-off operation, respectively.

12. The booting method as claimed in claim 9, further comprising:

in response to power supplied by the power supply unit being shut off, performing a first power saving operation to store data which is currently being processed in the volatile memory;

in response to an error occurring during the first power saving operation, performing a second power saving operation in order to store the data in the non-volatile memory the next time the power shuts off; and in response to an error occurring during the second power saving operation, performing a normal power off operation.

13. The booting method as claimed in claim 9, further comprising:

the error is at least one of memory leakage, memory fragmentation and deadlock.

14. The booting method as claimed in claim 9, further comprising:

the volatile memory is a RAM and the non-volatile memory is a hard disk or a flash memory.

15. The booting method as claimed in claim 9, further comprising, in response to an error not occurring in the first booting mode or the second booting mode, setting a corresponding the first booting mode or the second booting mode as a booting mode.

16. The booting method as claimed in claim 15, further comprising:

in response to a pre-set booting mode being the first booting mode, performing booting in the first booting mode;

in response to the pre-set booting mode not being the first booting mode, determining whether or not the booting is being performed in the third booting mode; and in response to a determination that the booting is not being performed in the third booting mode, performing the booting in the second booting mode.

* * * * *